United States Patent
Jha et al.

(10) Patent No.: US 10,513,349 B2
(45) Date of Patent: Dec. 24, 2019

(54) COMBINED AIRCRAFT TAKE-OFF AND TOWER SIGNAL LIGHT UNIT AND AIRCRAFT COMPRISING THE SAME

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE); Norbert Menne, Paderborn (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/983,153

(22) Filed: May 18, 2018

(65) Prior Publication Data
US 2018/0334264 A1 Nov. 22, 2018

(30) Foreign Application Priority Data
May 19, 2017 (EP) ..................................... 17171916

(51) Int. Cl.
*B64D 47/04* (2006.01)
*B64D 47/06* (2006.01)

(52) U.S. Cl.
CPC .............. *B64D 47/04* (2013.01); *B64D 47/06* (2013.01)

(58) Field of Classification Search
CPC .......... F21V 29/74; F21V 29/763; F21S 45/48
See application file for complete search history.

(56) References Cited

U.S. PATENT DOCUMENTS

| 6,244,728 B1 | 6/2001 | Cote et al. |
| 2003/0193813 A1 | 10/2003 | Collins |
| 2008/0137353 A1* | 6/2008 | Larsen .................. B64D 47/04 362/470 |
| 2011/0198997 A1 | 8/2011 | Curtis |
| 2016/0076722 A1* | 3/2016 | Hessling von Heimendahl .......... B64D 47/04 362/470 |

(Continued)

FOREIGN PATENT DOCUMENTS

| EP | 2985227 A1 | 2/2016 |
| EP | 3159713 A1 | 4/2017 |

OTHER PUBLICATIONS

Extended European Search Report for International Application No. 17171916.4 dated Aug. 10, 2017, 8 pages.

(Continued)

*Primary Examiner* — Mary Ellen Bowman
(74) *Attorney, Agent, or Firm* — Cantor Colburn LLP (57) ABSTRACT

A combined aircraft take-off and tower signal light unit comprises a mounting portion for mounting the combined aircraft take-off and tower signal light unit to an aircraft, wherein the mounting portion is configured for orienting a horizontal cross-sectional plane (H) of the combined aircraft take-off and tower signal light unit substantially horizontally with respect to the aircraft; and at least one light source. The combined aircraft take-off and tower signal light unit has a take-off light output, which is centered on a take-off light emission axis and which has a take-off light peak intensity, and a tower signal light output, which is centered on a tower light emission axis (B) and which has a tower light peak intensity.

20 Claims, 6 Drawing Sheets

(56) References Cited

U.S. PATENT DOCUMENTS

2016/0345408 A1 11/2016 Schoen et al.
2017/0073083 A1* 3/2017 Hessling-von Heimendahl ..........
B60Q 1/085

OTHER PUBLICATIONS

Anonymous: "What is the difference between landing lights, taxi lights and external lights?—Aviation Stack Exchange", Oct. 12, 2015, XP055617460, Retrieved from the Internet: URL: https://aviation.stackexchange.com/questions/21916/what-is-the-difference-between-landing-lights-taxi-lights-and-external-lights[retrieved on Sep. 2, 2019].
Communication pursuant to Article 94 (3) EPC, for Application No. 17 171 916A-1010, dated Sep. 11, 2019 13 pages.

\* cited by examiner

COMBINED AIRCRAFT TAKE-OFF AND TOWER SIGNAL LIGHT UNIT AND AIRCRAFT COMPRISING THE SAME

FOREIGN PRIORITY

This application claims priority to European Patent Application No. 17171916.4 filed May 19, 2017, the entire contents of which is incorporated herein by reference.

BACKGROUND

The present invention relates to the field of aircraft lighting, in particular to an exterior aircraft light unit and to an aircraft comprising the same.

Almost all aircraft are equipped with exterior aircraft light units. In particular, large passenger air planes have a wide variety of exterior aircraft light units. Examples include take-off and/or landing light units, taxi light units, navigation light units and anti-collision light units. Modern aircraft have a large variety of different light units for different purposes. Hence, many functionalities are present in modern exterior aircraft lighting systems. As a result, highly complex exterior aircraft lighting systems are present.

Accordingly, it would be beneficial to provide an exterior aircraft light unit that increases the functionality of the exterior aircraft lighting system, without adding a high degree of complexity.

SUMMARY

Exemplary embodiments of the invention include a combined aircraft take-off and tower signal light unit comprising at least one light source and a mounting portion for mounting the exterior aircraft light unit to an aircraft, in particular to a front running gear of the aircraft. The mounting portion is configured for orienting a horizontal cross-sectional plane of the combined aircraft take-off and tower signal light unit substantially horizontally with respect to the aircraft, i.e. parallel to ground when the aircraft is standing on substantially even ground.

A combined aircraft take-off and tower signal light unit according to an exemplary embodiment of the invention generates a take-off light output around a take-off light emission axis, and a tower signal light output around a tower light emission axis. The take-off light output has a take-off light peak intensity, and the tower signal light output has a tower light peak intensity, which is smaller than the take-off light peak intensity. The take-off light emission axis is oriented straight ahead parallel to the longitudinal axis of the aircraft. The tower light emission axis, when projected onto the horizontal cross-sectional plane, is oriented at an angle in the range of 10° to 30°, in particular at an angle in the range 15° and 25°, more particularly at an angle of 20°, with respect to the take-off light emission axis.

Exemplary embodiments of the invention also include an aircraft comprising an exterior aircraft light unit according to an exemplary embodiment of the invention, wherein the take-off light emission axis in particular is parallel to the longitudinal axis of the aircraft fuselage, i.e. wherein the take-off light emission axis is in the straight ahead direction of the aircraft.

Exemplary embodiments of the invention allow for combining the take-off functionality of a take-off light unit with a signal to the air and/or ground traffic control personnel, which is usually located in some distance above the ground in a building generally called the "tower", that the aircraft is ready to start. During the take-off procedure, the pilot switches on the take-off light unit after receiving clearance from traffic control and before accelerating the aircraft. As the light unit according to exemplary embodiments of the invention is a combined aircraft take-off and tower signal light unit, the pilot may at the same time and with the same light unit send a confirmation signal to the tower. In this way, traffic control personnel is notified of the immediate take-off.

The provision of a separate tower signal light output in addition to the take-off light output allows for optimizing both light outputs independently from each other. In particular, both light outputs may be designed to have little stray light. In this way, the take-off light output, which poses a risk of glaring the pilot due to undesired reflections in foggy, rainy or snowy conditions, may be optimized for minimum pilot glare. At the same time, the tower signal light output may be optimized for safe recognition by the tower personnel. As compared to previous approaches, where the take-off light unit had a very broad opening angle that could also be seen by the tower and thus gave an indication about the imminent take-off, exemplary embodiments of the present invention allow for reliable signalling to the tower, while keeping low or avoiding the glare issues of broad take-off light beams. In addition, the efficiency of the take-off light functionality may be increased as compared to such previous approaches. Overall, a high efficiency may be combined with a low risk of producing undesired glare to the pilot, while still providing for improved signalling to the tower via the dedicated tower signal light output.

Generating a specific tower signal light output, which is oriented along a line extending from the start of the runway at a horizontal angle of 10° to 30° with respect to the longitudinal direction of the runway and at a vertical angle of 2° to 4° with respect to the ground, allows the tower personnel of many airports all around the world to reliably recognize said tower signal light. A tower signal light output according to exemplary embodiments of the invention does not emit any additional light in the pilots' line of sight and thus does not increase the risk of causing additional glare to the pilot(s). The general orientation of the tower signal light output, i.e. the tower light emission axis, may have an angle of between 0° and 5°, in particular of between 2° and 4° with respect to the take-off light emission axis, i.e. with respect to the straight ahead direction of the aircraft.

In an embodiment, the tower light peak intensity is between 0.1% and 10%, in particular between 0.5% and 5%, of the take-off light peak intensity. The peak intensity of the take-off light output in particular may be approx. 500,000 cd, and the peak intensity of the tower signal light output may be approx. 5,000 cd, i.e. 1% of the peak intensity of the tower signal light output. A tower signal light output having a peak intensity of 5,000 cd to 7,000 cd, in particular 6,000 cd has been determined as being sufficient for being reliably recognized by tower personnel.

In an embodiment, the take-off light output has a horizontal take-off light opening angle around the take-off light emission axis in the horizontal cross-sectional plane, wherein the horizontal take-off light opening angle is between 5° and 20°, in particular between 10° and 15°. Such a horizontal take-off light opening angle has been identified as providing a strong illumination of the area in front of the aircraft, without considerably increasing the risk of glare caused by the take-off light output.

In an embodiment, the take-off light output, when projected onto the vertical cross-sectional plane, has a vertical take-off light opening angle around the tower light emission axis, wherein the vertical take-off light opening angle is between 5° and 15°, in particular about 10°. Such a vertical take-off light opening output angle has been identified as providing a strong illumination of the area in front of the aircraft, without considerably increasing the risk of glare caused by the take-off light output.

In an embodiment, the tower signal light output, when projected onto the horizontal cross-sectional plane, has a horizontal tower signal opening angle around the tower light emission axis, wherein the horizontal tower signal opening angle is between 15° and 25°, in particular about 20°. Such a horizontal tower signal opening angle has been identified as providing a tower signal light output that is reliably recognizable in most of the towers.

In an embodiment, the tower signal light output, when projected onto the vertical cross-sectional plane, has a vertical tower signal opening angle around the tower light emission axis, wherein the vertical tower signal opening angle is between 2° and 8°, in particular between 3° and 5°. Such a vertical tower signal light output opening angle has been identified as providing a tower signal light output which is reliably recognizable in most towers.

In an embodiment, the stray light intensity between the take-off light output and the tower signal light output is less than 50%, in particular less than 30%, more particular less than 20%, of the tower light peak intensity. A low stray light intensity in the area between the take-off light output and the tower signal light output reduces the risk of glaring the pilot of the aircraft and/or pilots of other aircrafts, which are present in the vicinity of the aircraft.

In an embodiment, the combined aircraft take-off and tower signal light unit has two tower signal light outputs, which are oriented symmetrically with respect to a vertical cross-sectional plane extending along the longitudinal axis of the aircraft. Providing two symmetric tower signal light outputs ensures that at least one of tower signal light outputs is visible from each side of the aircraft. As a result, the tower signal light output may be detected reliably independently of the spatial orientation of the aircraft with respect to the tower.

In an embodiment, the combined aircraft take-off and tower signal light unit comprises at least one optical element, in particular a lens and/or a reflector, which is configured for forming at least one light output from the light emitted by the at least one light source.

In an embodiment, the combined aircraft take-off and tower signal light unit comprises a plurality of optical elements, wherein each optical element in particular is configured for deflecting light into only one of the light outputs.

In an embodiment, the combined aircraft take-off and tower signal light unit comprises a plurality of light sources. Each light source may be configured for emitting light which is deflected into only one of the light outputs, respectively. Associating each light source with only one of the light outputs allows individually switching the different light outputs on and off.

Alternatively, at least one light source may be configured for emitting light which is deflected into two different light outputs. Such a configuration allows for a very efficient use of the light source(s). It in particular may allow reducing the number of light sources used.

In an embodiment, the at least one light source is or includes an LED. LEDs provide efficient light sources producing only a relatively small amount of waste energy.

In an embodiment, the light sources producing the take-off light output and the tower signal light output, respectively, may be individually switchable in order to allow the pilot to selectively activate/deactivate the landing light and/or the tower signal light, respectively.

In an embodiment, the light sources generating the light forming the take-off light output and the tower signal light output, respectively, may be electrically connected to a common switch in order to be switched on and off only simultaneously. As a result, the tower signal light output is switched on any time the take-off light output is switched on. As a result, the tower signal light output reliably indicates whether the take-off light output is switched on or off.

In an embodiment, the combined aircraft take-off and tower signal light unit is configured for additionally emitting a taxi light output which is configured for illuminating the runway/taxi-way in front of the aircraft, in particular when the aircraft is moving from and to its parking position. Integrating a taxi light functionality into the aircraft take-off and tower signal light unit reduces the number of light units to be mounted to the aircraft. This reduces the cost for production and maintenance.

The taxi light output may be switchable separately of or only in combination with the tower signal light output, respectively.

BRIEF DESCRIPTION OF THE DRAWINGS

In the following, an exemplary embodiment of a combined aircraft take-off and tower signal light unit is described in more detail with reference to the enclosed figures.

DETAILED DESCRIPTION

Figure 1:
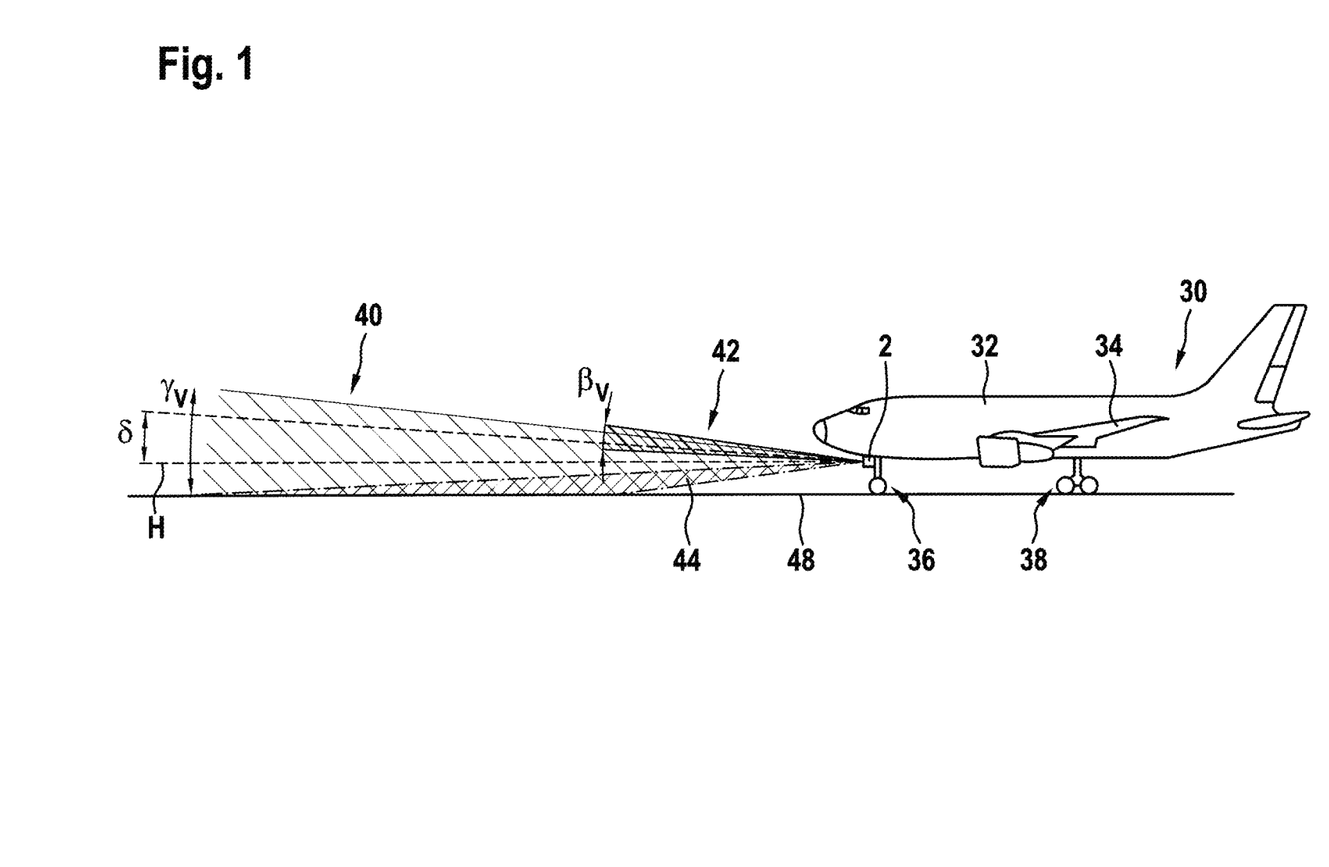
FIG. 1 depicts a side view of an airplane comprising an exterior aircraft take-off and tower signal light unit according to an exemplary embodiment of the invention.
Figure 2:
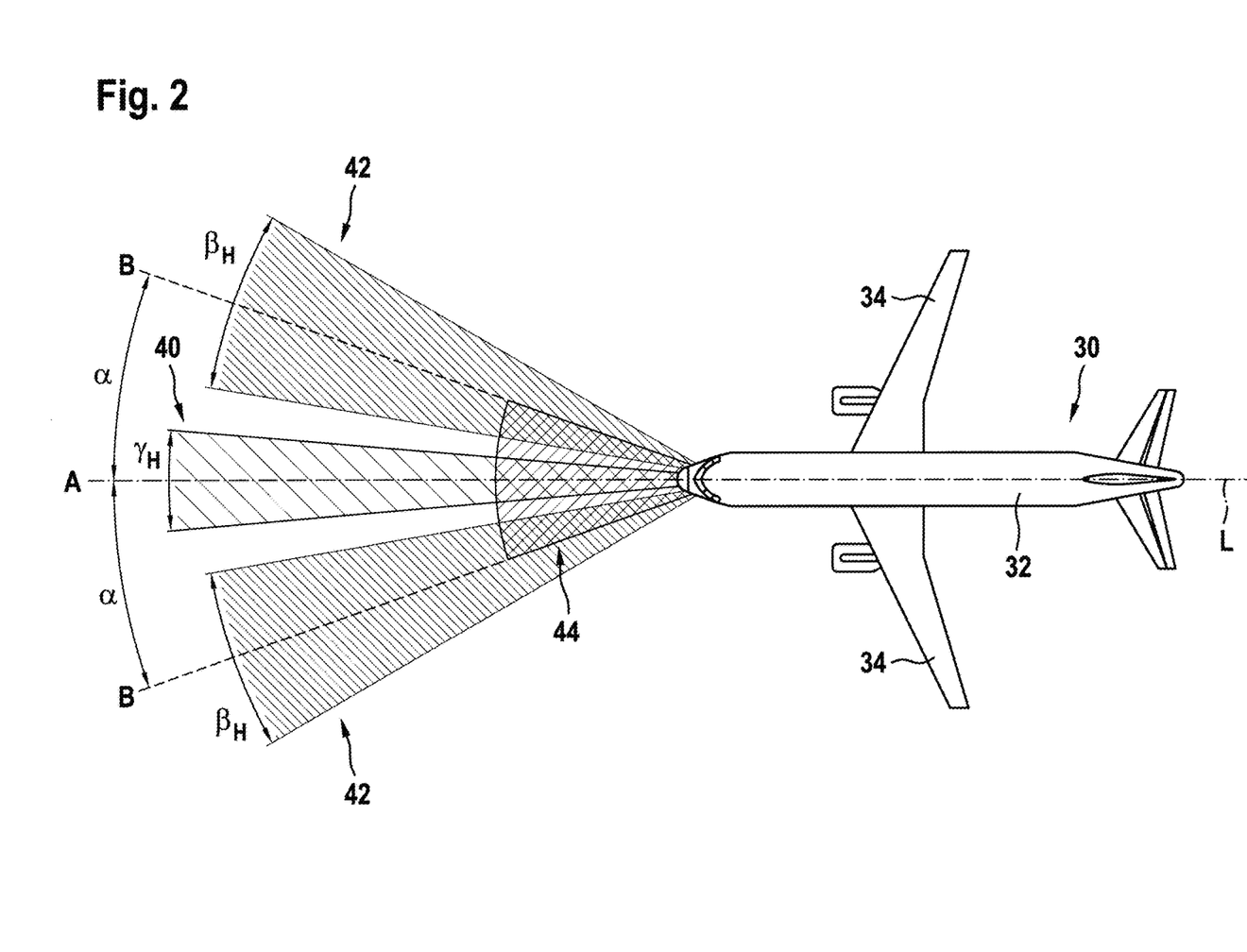
FIG. 2 depicts a top view of an airplane comprising an exterior aircraft take-off and tower signal light unit according to an exemplary embodiment of the invention.

FIG. 1 depicts a side view and FIG. 2 depicts a top view of an aircraft 30, in particular an airplane 30 comprising an exterior aircraft take-off and tower signal light unit 2 according to an exemplary embodiment of the invention.

In the embodiment shown in FIGS. 1 and 2, the exterior aircraft take-off and tower signal light unit 2 is mounted to a front running gear 36 of the airplane 30. In alternative embodiments, which are not explicitly shown in the figures, the exterior aircraft take-off and tower signal light unit 2 may be mounted to the fuselage 32, a wing 34 or a main running gear 38 of the airplane 30, respectively.

The exterior aircraft take-off and tower signal light unit 2 is mounted to the airplane 30 in an orientation in which a horizontal cross-sectional plane H of the combined aircraft take-off and tower signal light unit 2 is oriented substantially parallel to the ground 48.

The aircraft take-off and tower signal light unit 2 emits at least three light outputs 40, 42, for example light cones, including a take-off light output 40 and two tower signal light outputs 42.

The take-off light output 40 has an opening angle $\gamma_H$ of approximately 12° (+/−6°) around a take-off light emission axis (A) in the horizontal cross-sectional plane (H), and an opening angle $\gamma_V$ of approximately 10° (+/−5°) in a vertical cross-sectional plane, which is oriented perpendicularly to the horizontal cross-sectional plane (H). The take-off light output 40 is centered around a take-off light emission axis A, which is oriented parallel to a longitudinal axis L of the aircraft 2. When the aircraft take-off and tower signal light unit 2 is mounted on the longitudinal axis L of the aircraft 30, the take-off light emission axis A coincides with the longitudinal axis L of the aircraft 30, when projected onto a common horizontal cross-sectional plane H.

When projected onto the horizontal cross-sectional plane H, the tower signal light outputs 42 have an opening angle β of 15° to 25°, in particular an opening angle β of 20° around a tower light emission axis B, respectively. The tower light emission axes B of the two tower signal light outputs 42 are oriented at an angle α of 10° to 30°, in particular at an angle of 20° with respect to the longitudinal axis L of the aircraft 30, respectively (see FIG. 2). When projected onto the vertical cross-sectional plane, the tower light emission axes B of the tower signal light outputs 42 are oriented upwards at an angle δ of about 3.5° with respect to the horizontal cross-sectional plane H (see FIG. 1).

The opening angles are defined as those regions of the take-off light output/tower signal light output where the light intensity is greater than 10% of the peak light intensity in the take-off light output, also referred to as take-off light peak intensity, and the tower signal light output, also referred to as tower light peak intensity, respectively.

The aircraft take-off and tower signal light unit 2 optionally may emit an additional taxi light output 44. The taxi light output 44 may be a relatively broad light output, which is also centered on the longitudinal axis L when projected onto the horizontal cross-sectional plane H, but which is oriented downwards with respect to the horizontal cross-sectional plane H for illuminating the ground/runway 48 in front of the aircraft 30 (see FIG. 1).

Details of the light distributions of the different light outputs 40, 42, 44 will be discussed further below with respect to FIGS. 5 to 8.

Figure 3A:
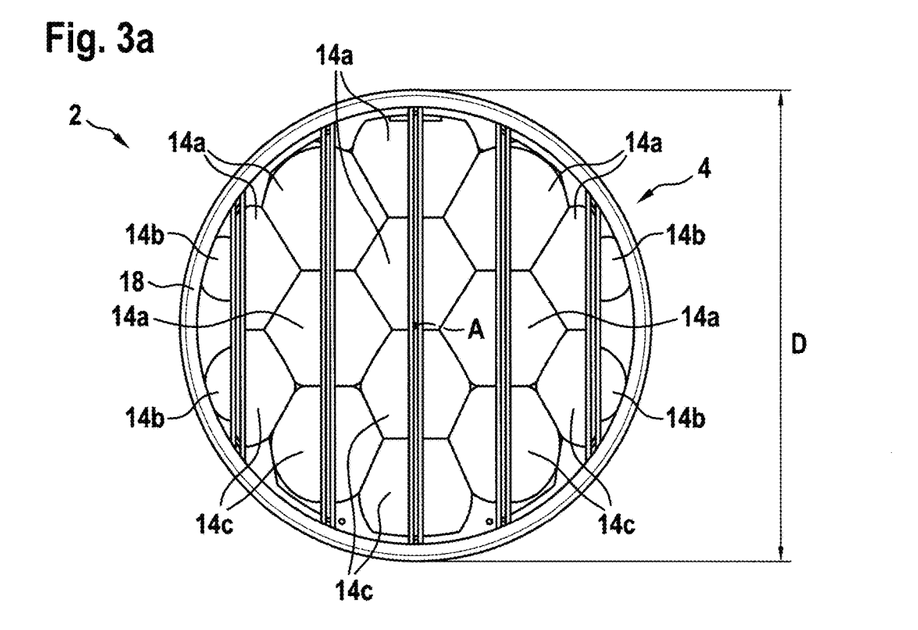
FIG. 3*a* shows a front view of an exterior aircraft take-off and tower signal light unit according to an exemplary embodiment of the invention.
Figure 3B:
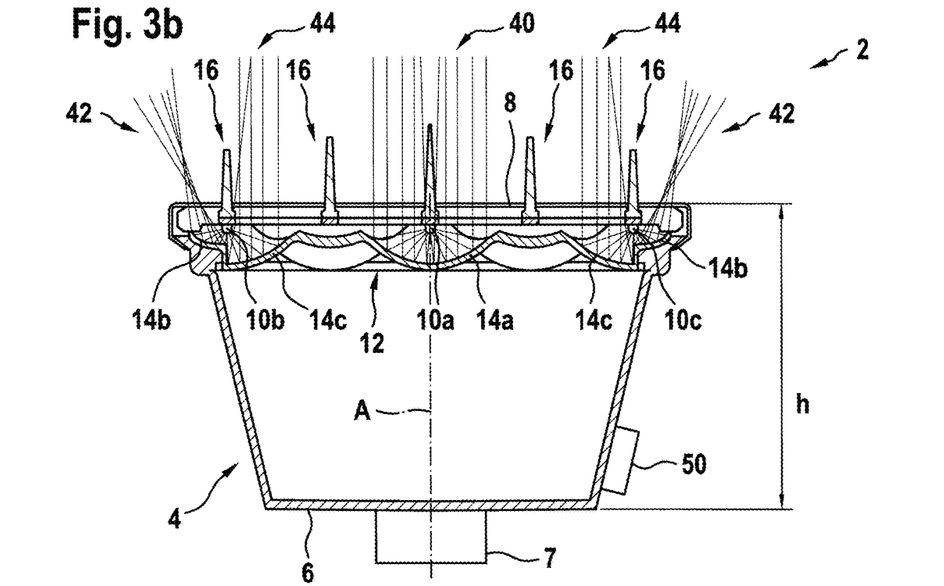
FIG. 3*b* shows a sectional view of an exterior aircraft take-off and tower signal light unit according to an exemplary embodiment of the invention.

FIG. 3a shows a front view of a combined aircraft take-off and tower signal light unit 2 according to an exemplary embodiment of the invention, and FIG. 3b shows a sectional view thereof.

The exterior aircraft take-off and tower signal light unit 2 comprises a cup-shaped housing 4 with a rear wall 6, which is shown at the bottom of FIG. 3b and which is not visible in FIG. 3a. The rear wall 6 comprises a mounting portion 7 (not visible in FIG. 3a), which is configured for mounting the housing 4 to an aircraft 30, e.g. to the fuselage 32, a wing 34 or a running gear 36, 38 of the airplane 30 (cf. FIGS. 1 and 2). The mounting portion 7 in particular is configured for mounting the housing 4 to the aircraft 30 such that a horizontal cross-sectional plane of the combined aircraft take-off and tower signal light unit 2 is oriented substantially parallel to the ground 48.

Figure 4:
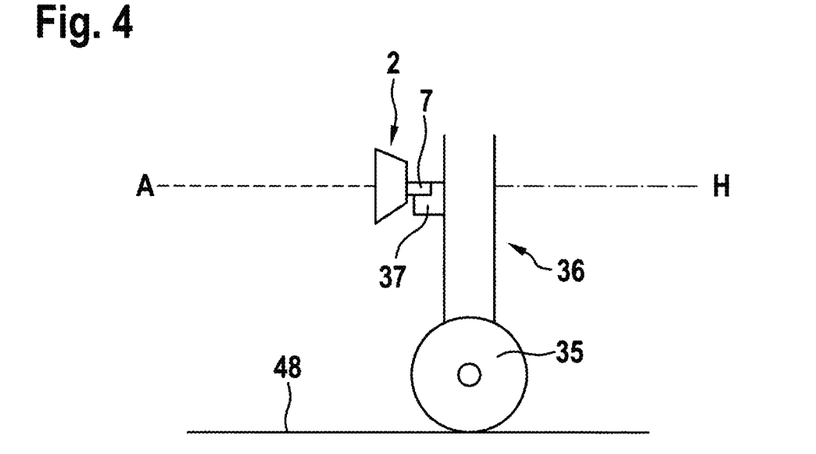
FIG. 4 schematically shows an exterior aircraft take-off and tower signal light unit according to an exemplary embodiment of the invention mounted to a running gear of an aircraft.

The housing 4 may be have a cylindrical shape around an axis A. Alternatively, the housing 4 may have a conical shape, as it is shown in FIGS. 3 and 4. The skilled person will understand that other geometrical shapes of the housing 4 are possible as well.

The cup-shaped housing 4 may have a maximum diameter D of 150 mm to 250 mm, in particular a maximum diameter D of 175 mm to 225 mm, more particularly a maximum diameter D of 210 mm.

The height h of the housing may be in the range of 50 mm to 250 mm, in particular in the range of 175 mm to 225 mm, more particularly close to 210 mm.

A support plate 8 is provided at the open front side of the housing 4, i.e. at the side opposite to the rear wall 6. The support plate 8, which in particular may be a printed circuit board (PCB), supports a plurality of electrical light sources 10a, 10b, 10c, in particular LEDs. In the embodiment shown in FIGS. 3 and 4, the light sources 10a, 10b, 10c are arranged on the side of the support plate 8 facing the rear wall 6 of the housing 4.

A reflector plate 12 is arranged between the support plate 8 and the rear wall 6 of the housing 4. A plurality of reflectors 14a, 14b, 14c facing the light sources 10a, 10b, 10c are formed within the reflector plate 12. As a result, light emitted from the light sources 10a, 10b, 10c is reflected by the reflectors 14a, 14b, 14c to the light emitting front side of the exterior aircraft take-off and tower signal light unit 2. In the orientation in which the exterior aircraft take-off and tower signal light unit 2 is shown in FIGS. 3 and 4, the light emitting front side is oriented to the top of the Figures.

The number of reflectors 14a, 14b, 14c may correspond with the number of light sources 10a, 10b, 10c. In particular, a single reflector 14a, 14b, 14c may be associated with each light source 10a, 10b, 10c, and vice versa.

Alternatively, the light, which is emitted by one of the light sources 10a, 10b, 10c, may be reflected by two or more reflectors 14b, 14c, as illustrated for the light sources 10b, 10c shown on the left and right sides of FIG. 3b. Although not explicitly shown in the figures, it is also possible that light generated by a plurality of light sources 10a, 10b, 10c is reflected by the same reflector 14a, 14b, 14c.

The light sources 10a, 10b, 10c and the reflectors 14a, 14b, 14c may be arranged in a honeycomb structure, as it is illustrated in FIG. 3a, or in any other structure which is suitable for generating the desired light distribution.

The support plate 8 is provided with windows/openings and/or formed at least partially transparent in order to allow the reflected light to pass through.

A heat sink comprising a plurality of cooling fins 16 is provided on the side of the support plate 8 which is opposite to the light sources 10a, 10b, 10c. The cooling fins 16 extend across an outer ring 18, which is arranged along the outer circumference of the housing 4.

There are at least two different types of reflectors 14a, 14b, 14c.

A first group of reflectors 14a are take-off light reflectors 14a. The take-off light reflectors 14a are configured for reflecting light, which is generated by at least one associated light source 10a, so that it contributes to the take-off light output 40.

A second group of reflectors 14b are tower signal light reflectors 14b. The tower signal light reflectors 14b are configured for reflecting the light, which is generated by at least one associated light source 10b, 10c, so that it contributes to one of the tower signal light outputs 42.

By selectively switching the light sources 10a, 10b, 10c associated with the take-off light reflectors 14a and the tower signal light reflectors 14b, the pilot may selectively activate/deactivate the landing light and/or the tower signal light, respectively. It is also possible that the light sources 10a, 10b, 10c associated with the take-off light reflectors 14a and the tower signal light reflectors 14b are connected to a common switch 50, so that they are jointly switched on/off by the pilot.

In the latter case, the tower signal light output 42 is switched on any time the take-off light output 40 is switched on. As a result, the tower signal light output 42 reliably indicates whether the take-off light output 40 is switched on or off.

The combined aircraft take-off and tower signal light unit 2 according to the exemplary embodiment shown in FIGS. 3 and 4 further comprises a third group of light reflectors 14c, which are taxi light reflectors 14c. The taxi light reflectors 14c are configured for reflecting the light generated by at least one associated light source 10b, 10c so that it contributes to the taxi light output 44 shown in FIGS. 1 and 2.

By selectively switching the light sources 10b, 10c associated with the taxi light reflectors 14c on and off, the pilot may selectively activate/deactivate the taxi light output 44. Optionally, the light sources 10b, 10c associated with the taxi light reflectors 14c may be electrically coupled with the light sources 10b, 10c associated with the tower signal light reflectors 14b, so that the tower signal light output 42 is switched on any time the taxi light output 44 is switched on.

FIG. 4 schematically shows an exterior aircraft take-off and tower signal light unit 2 according to an exemplary embodiment of the invention mounted to a running gear 36, in particular a front running gear 36 of an aircraft 30, which is not shown in FIG. 4.

The running gear 36 comprises at least one tire 35 and a mounting element 37, which is configured to interact with the mounting portion 7 of the aircraft take-off and tower signal light unit 2 for mounting the aircraft take-off and tower signal light unit 2 to the running gear 36. The mounting portion 7 and the mounting element 37 in particular are configured such that the take-off light emission axis A is oriented substantially horizontally with respect to the aircraft 30, extending within the horizontal cross-sectional plane H, which is oriented parallel to the ground 48.

Figure 6:
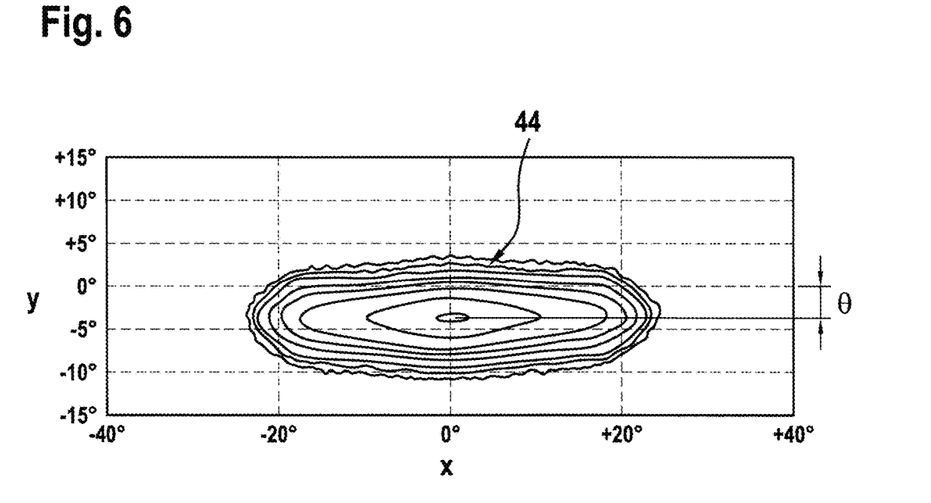
FIG. 6 illustrates an exemplary light distribution of a taxi light output.
Figure 7:
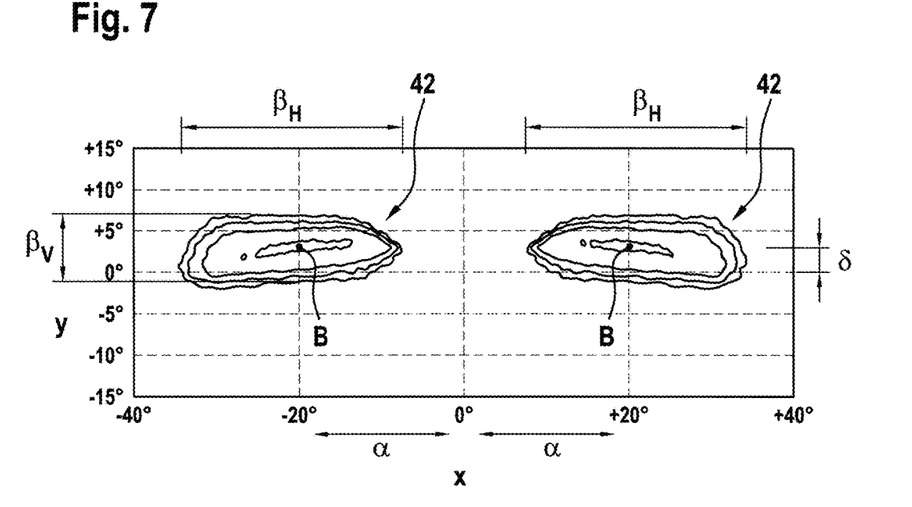
FIG. 7 illustrates an exemplary light distribution of two tower signal light outputs.
Figure 8:
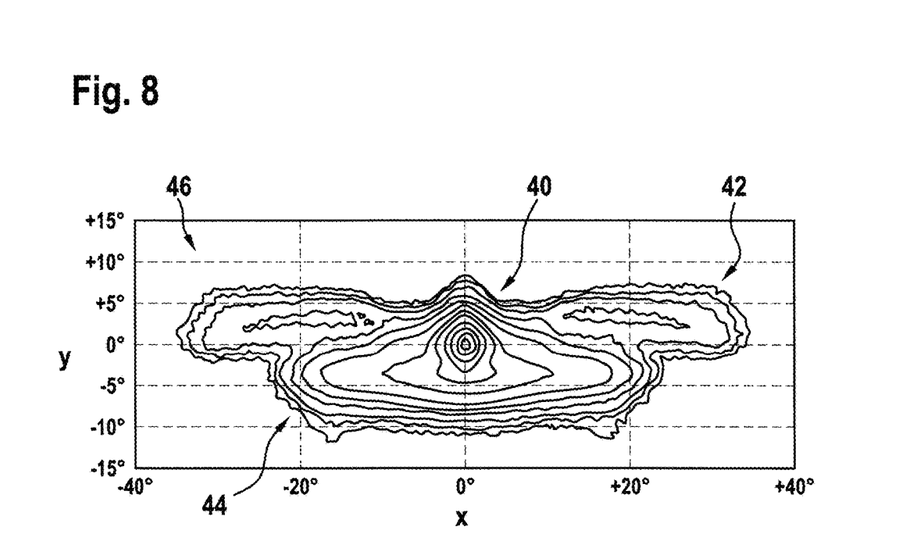
FIG. 8 illustrates the light distribution of a combination of the light outputs emitted by a take-off light, a taxi light and a tower signal light.

FIGS. 5 to 8 illustrate examples of light distributions of the take-off light output 40 (FIG. 5), the taxi light output 44 (FIG. 6), two tower signal light outputs 42 (FIG. 7), and a combination 46 of all these light outputs 40, 42, 44 (FIG. 8).

In the diagrams plotted in FIGS. 5 to 8, the angle x within the horizontal cross-sectional plane H is plotted on the horizontal axis and the angle y within a vertical cross-sectional plane, which is oriented perpendicularly to the horizontal cross-sectional plane H, is plotted on the vertical axis.

Figure 5:
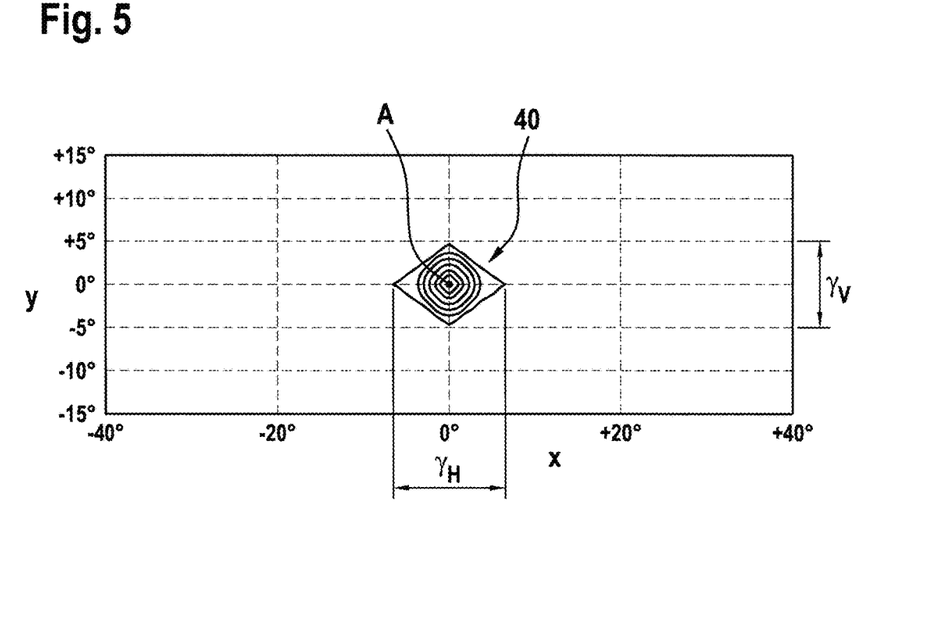
FIG. 5 illustrates an exemplary light distribution of a take-off output.

FIG. 5 shows that the take-off light output 40 is centered on the straight ahead direction of the aircraft 30 and has an opening angle $\gamma_V$ of approximately 10° (+/−5°) in the vertical direction and an opening angle $\gamma_H$ of approximately 12° (+/−6°) in the horizontal direction. The maximum intensity at the center of the take-off light output 40 is approximately 500,000 cd. As indicated above, the opening angles are defined as those regions of the take-off light output, where the light intensity is above 10% of the maximum intensity at the center of the take-off light output 40, i.e. above 10% of the take-off light peak intensity. In FIG. 5, various iso-intensity lines of the take-off light output 40 are drawn.

The taxi light output 44, which is illustrated in FIG. 6, is wider in the horizontal cross-sectional plane H having an opening angle $\gamma_H$ of approximately 40° (+/−20°), when projected onto the cross-sectional plane. For illuminating the ground 48 in front of the aircraft 30, the taxi light output 44 is oriented downwardly, i.e. the center of the taxi light output 44 is oriented in an angle θ<0°, in particular at an angle −4.5°<θ<−4° with respect to the horizontal cross-sectional plane H. The maximum intensity at the center of the taxi light output 44 is approximately 100,000 cd.

The tower signal light outputs 42, the light distributions of which are illustrated in FIG. 7, are not centered on the straight ahead direction of the aircraft (x=0), but at horizontal angles α of approximately +/−20°. Further, the tower signal light outputs 42 are oriented upwards at an angle δ of appropriately 3.5° with respect to the horizontal cross-sectional plane H in order to be visible by tower personal, which is located in some height above the ground 48. The tower signal light outputs 42 have an opening angle of approximately 6° in the vertical direction and an opening angle β of approximately 20° (+/−10°) in the horizontal direction.

The maximum intensity of the tower signal light outputs 42 is approximately 5,000 cd, i.e. only about 1% of the maximum intensity of the take-off light output 40 and about 5% of the intensity of the taxi light output 44.

The skilled person, however, will understand that these intensity values and distributions shown in FIGS. 5 to 7 are only exemplary and may be modified according to the actual needs.

FIG. 8 shows the combined light distribution 48 in case the light sources 10 of all three light outputs 40, 42, 44 are switched on.

The light intensity between the take-off light output 40 and the tower signal light output 42 may be less than 50%, in particular less than 30%, more in particular less than 20%, of the tower light peak intensity. Such a low intensity of the light in the area between the take-off light output 40 and the tower signal light output 42 reduces the risk of glaring the pilot of the aircraft 30 and/or pilots of other aircrafts which are present in the vicinity of the aircraft 30, while providing reliable signalling to the tower.

The invention claimed is:

1. A combined aircraft take-off and tower signal light unit comprising:
    at least one take-off light source and at least one tower light source; and
    a mounting portion which is configured for mounting the combined aircraft take-off and tower signal light unit to an aircraft, wherein the mounting portion is configured for orienting a horizontal cross-sectional plane (H) of the combined aircraft take-off and tower signal light unit substantially horizontally with respect to the aircraft;
    wherein the combined aircraft take-off and tower signal light unit has a take-off light output around a take-off light emission axis (A) and a tower signal light output around a tower light emission axis (B), wherein the take-off light output has a take-off light peak intensity and the tower signal light output has a tower light peak intensity, which is smaller than the take-off light peak intensity;
    wherein the tower light emission axis (B) is oriented at an angle of between 10° to 30° with respect to the take-off light emission axis (A), when projected onto the horizontal cross-sectional plane (H); and
    wherein the combined aircraft take-off and tower signal light unit has a first group of optical elements, which are take-off light optical elements for modifying light, generated by the at least one take-off light source, so that it contributes to the take-off light output;

wherein the combined aircraft take-off and tower signal light unit has a second group of optical elements, which are tower signal light optical elements for modifying light, generated by the at least one tower light source, so that it contributes to the tower signal light output, and wherein the tower light emission axis (B) is oriented at an angle (δ) between 0° and 5° with respect to the take-off light emission axis (A), when projected onto a vertical cross-sectional plane, which is oriented perpendicularly to the horizontal cross-sectional plane (H).

2. A combined aircraft take-off and tower signal light unit according to claim 1, wherein the tower light peak intensity is between 0.1% and 10%, of the take-off light peak intensity.

3. A combined aircraft take-off and tower signal light unit according claim 1, wherein the combined aircraft take-off and tower signal light unit has two tower signal light outputs, which are oriented symmetrically to each other with respect to a vertical cross-sectional plane containing the take-off light emission axis (A).

4. A combined aircraft take-off and tower signal light unit according to claim 1, wherein the take-off light output has a horizontal take-off light opening angle (γH) around the take-off light emission axis (A) in the horizontal cross-sectional plane (H), wherein the horizontal take-off light opening angle (γH) is between 5° and 20°, and wherein the take-off light output has a vertical take-off light opening angle (γV) around the take-off light emission axis (A) in a vertical cross-sectional plane, which is oriented perpendicularly to the horizontal cross-sectional plane (H), wherein the vertical take-off light opening angle (γV) is between 5° and 15°.

5. A combined aircraft take-off and tower signal light unit according to claim 2, wherein the tower signal light output has a horizontal tower signal opening angle (βH) around the tower light emission axis (B), when projected onto the horizontal cross-sectional plane (H), wherein the horizontal tower signal opening angle (βH) is between 15° and 25°, and wherein the tower signal light output has a vertical tower signal opening angle (βV) around the tower light emission axis (B) in a vertical cross-sectional plane, wherein the vertical tower signal opening angle (βV) is between 2° and 8°.

6. A combined aircraft take-off and tower signal light unit according to claim 1, wherein the light intensity between the take-off light output and the tower signal light output is less than 50%, in particular less than 30%, more in particular less than 20%, of the tower light peak intensity.

7. A combined aircraft take-off and tower signal light unit according to claim 1, wherein the take-off light output and the tower signal light output are connected to a common switching element for being jointly switchable between an on state and an off state.

8. A combined aircraft take-off and tower signal light unit according to claim 1, wherein at least one of the optical elements of the first group of optical elements and the second group of optical elements are lenses and/or reflectors.

9. A combined aircraft take-off and tower signal light unit according to claim 1, comprising a plurality of light sources, wherein each light source is configured for emitting light which is deflected for being part of only one of the take-off light output and the tower signal light output, respectively.

10. A combined aircraft take-off and tower signal light unit according to claim 1, comprising a plurality of light sources, wherein at least one light source is configured for emitting light which is deflected for being part of both the take-off light output and the tower signal light output.

11. A combined aircraft take-off and tower signal light unit according to claim 1, wherein at least one of the at least one take-off source and the at least one tower light source includes an LED.

12. A combined aircraft take-off and tower signal light unit according claim 1, wherein the combined aircraft take-off and tower signal light unit is a combined take-off, tower signal light and taxi light unit, which is configured for additionally emitting a taxi light output.

13. The combined aircraft take-off and tower signal light unit according claim 1, wherein the mounting portion is attached to a front running gear of the aircraft.

14. An aircraft comprising an exterior aircraft take-off and tower signal light unit according to claim 1, wherein the take-off light emission axis (A) coincides with a longitudinal axis (L) of the aircraft.

15. An aircraft comprising an exterior aircraft take-off and tower signal light unit according to claim 1, wherein the tower light emission axis (B) is oriented at an angle of between 15° to 25° with respect to the take-off light emission axis (A), when projected onto the horizontal cross-sectional plane (H).

16. An aircraft comprising an exterior aircraft take-off and tower signal light unit according to claim 1, wherein the tower light emission axis (B) is oriented at an angle (δ) between 2° and 4° with respect to the take-off light emission axis (A), when projected onto the vertical cross-sectional plane, which is oriented perpendicularly to the horizontal cross-sectional plane (H).

17. An aircraft comprising an exterior aircraft take-off and tower signal light unit according to claim 1, wherein the tower light peak intensity is between 0.5% and 5% of the take-off light peak intensity.

18. An aircraft comprising an exterior aircraft take-off and tower signal light unit according to claim 1, wherein the light intensity between the take-off light output and the tower signal light output is less than 20% of the tower light peak intensity.

19. An aircraft comprising an exterior aircraft take-off and tower signal light unit according to claim 1, wherein the take-off light output has a horizontal take-off light opening angle (γH) around the take-off light emission axis (A) in the horizontal cross-sectional plane (H), wherein the horizontal take-off light opening angle (γH) is between 10° and 15° and wherein the take-off light output has a vertical take-off light opening angle (γV) around the take-off light emission axis (A) in a vertical cross-sectional plane, which is oriented perpendicularly to the horizontal cross-sectional plane (H), wherein the vertical take-off light opening angle (γV) is about 10°.

20. An aircraft comprising an exterior aircraft take-off and tower signal light unit according to claim 1, wherein the tower signal light output has a horizontal tower signal opening angle ($\beta_H$) around the tower light emission axis (B), when projected onto the horizontal cross-sectional plane (H), wherein the horizontal tower signal opening angle ($\beta_H$) is about 20° and wherein the tower signal light output has a vertical tower signal opening angle ($\beta_V$) around the tower light emission axis (B) in a vertical cross-sectional plane, wherein the vertical tower signal opening angle ($\beta_V$) is between 3° and 5°.

* * * * *